Dec. 25, 1923.

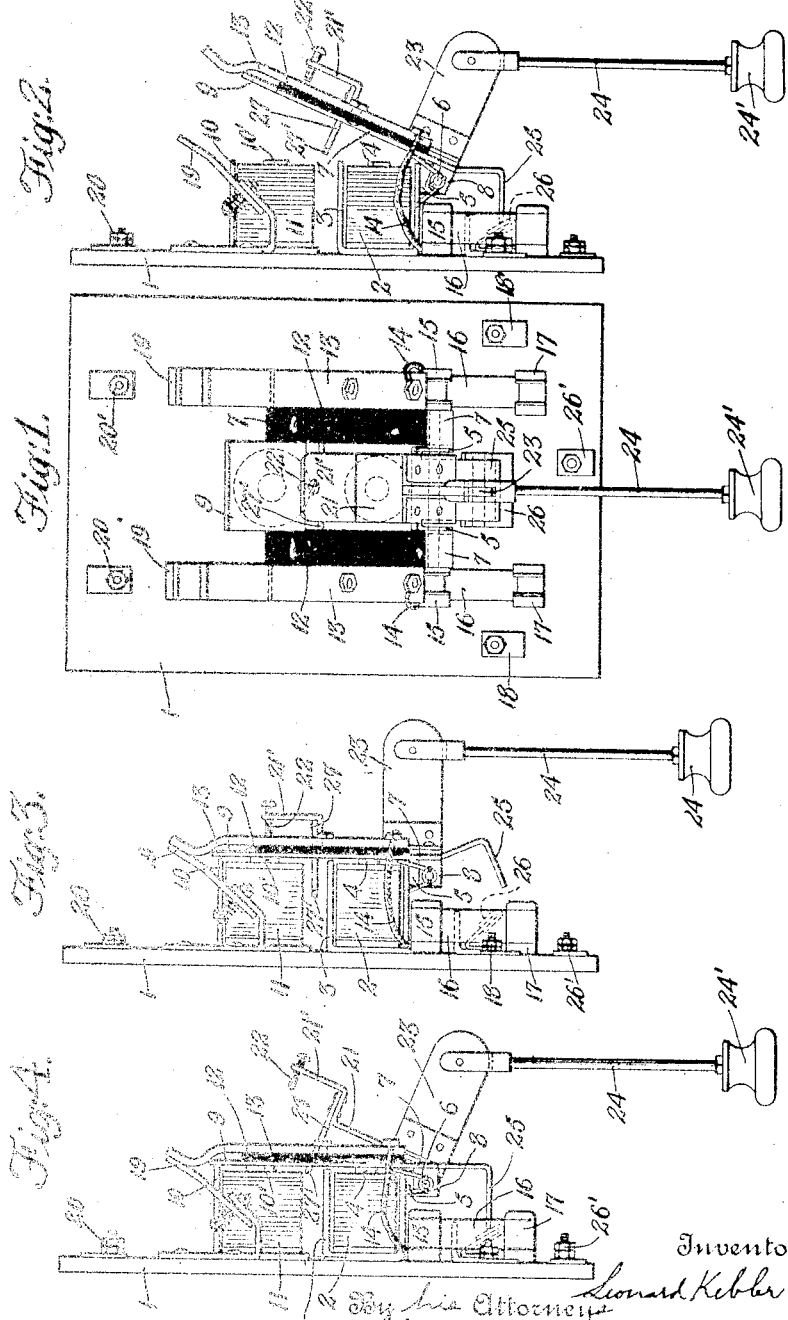

L. KEBLER 1,478,713

ELECTRIC MOTOR CONTROLLER

Filed April 1, 1920   4 Sheets-Sheet 2

Inventor
Leonard Kebler
By his Attorneys
Edwards, Sager & Bower

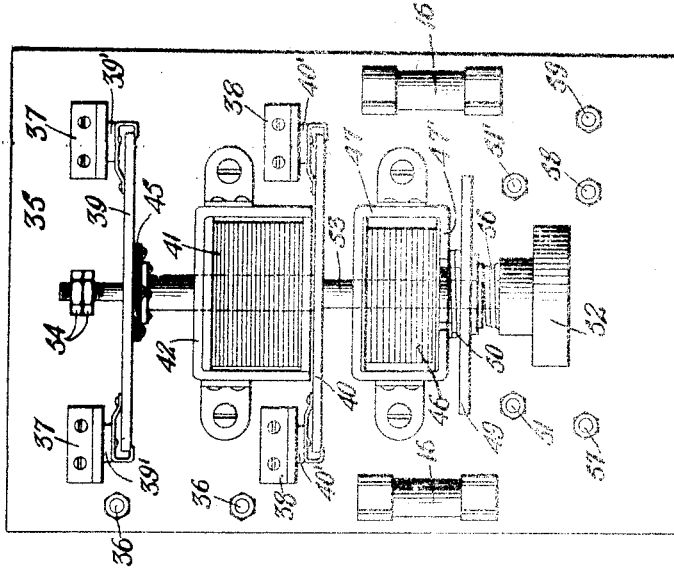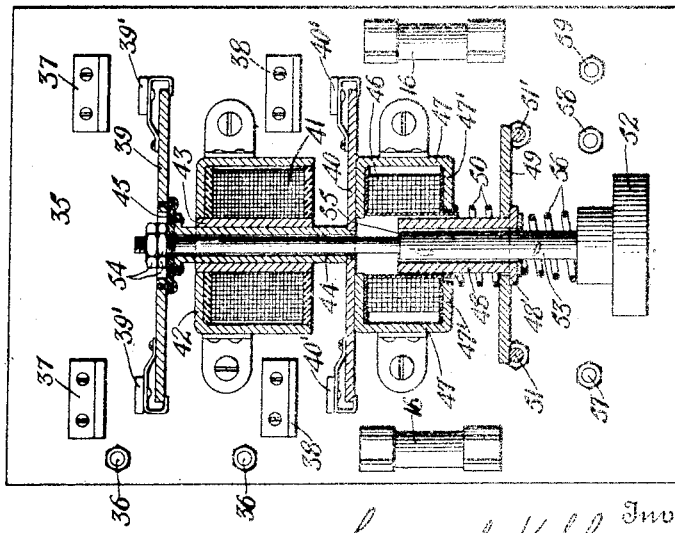

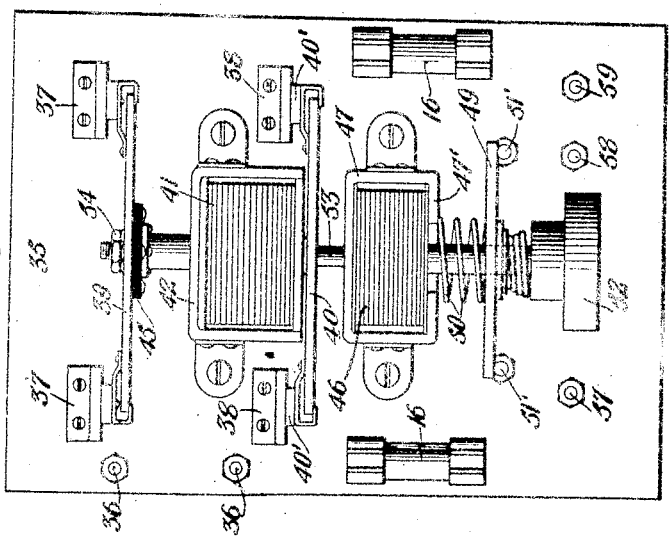
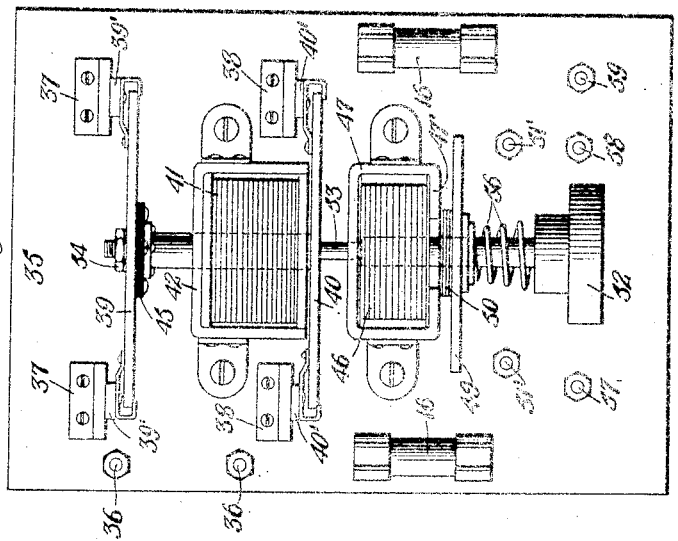

Patented Dec. 25, 1923.

1,478,713

UNITED STATES PATENT OFFICE.

LEONARD KEBLER, OF BRONXVILLE, NEW YORK, ASSIGNOR TO WARD LEONARD ELECTRIC COMPANY, A CORPORATION OF NEW YORK.

ELECTRIC-MOTOR CONTROLLER.

Application filed April 1, 1920. Serial No. 370,393.

*To all whom it may concern:*

Be it known that I, LEONARD KEBLER, a citizen of the United States, residing at Bronxville, in the county of Westchester and State of New York, have invented certain new and useful Improvements in Electric-Motor Controllers, of which the following is a specification.

This invention relates to automatic means for starting and controlling the circuits of an electric motor so as to secure automatic control and protection of the motor and circuits during starting and running conditions.

One object of the invention is to insure the insertion of the starting resistance before closing the motor circuit and to insure the removal of the starting resistance as soon as the motor attains the proper speed. Another object is to provide protecting means during running conditions against the occurrence of no-voltage and overload and to combine such means with the controlling means for starting in such inter-relation as will simplify the construction and produce a small device of comparatively large capacity. Another object is to simplify the construction and relationship of the parts so as to give low cost of manufacture. Other objects and features of my invention will be understood from the following description and accompanying drawings illustrating preferred embodiments of my invention.

Figure 5:
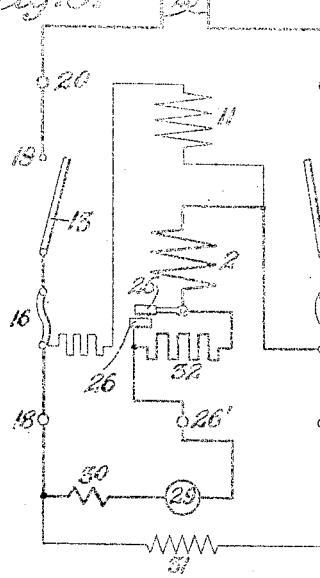
Figure 6:
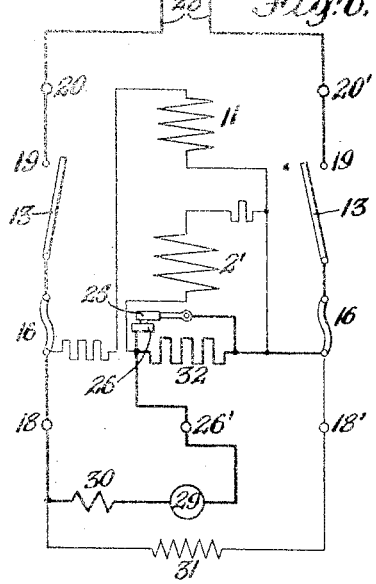
Figure 11:
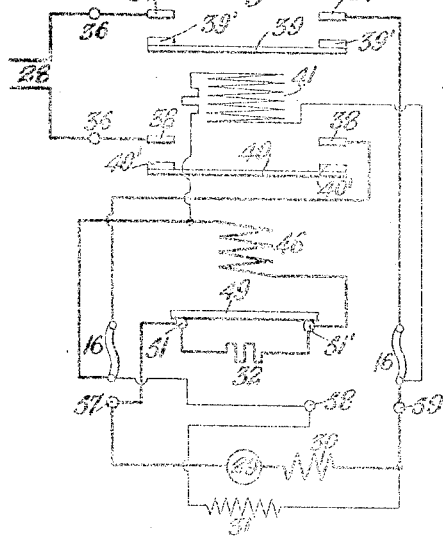
Figure 12:
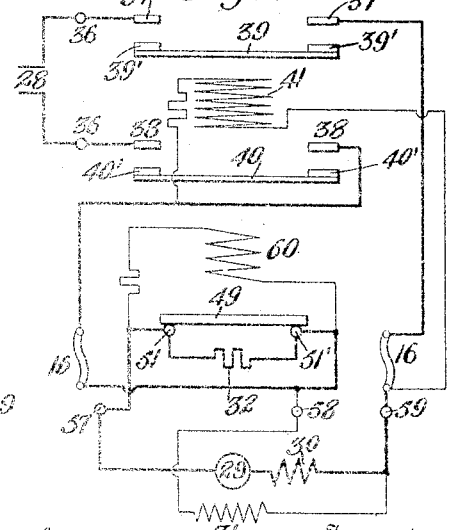

Fig. 1 is a front elevation of one embodiment of my invention; Fig. 2 is a side view showing the parts in open circuit position; Fig. 3 is a side view showing the device closed for starting; Fig. 4 is a side view showing the parts in running position after the motor has attained proper speed; Fig 5 is a diagram of electrical connections; Fig. 6 is a diagram of connections showing a modified connection and form of coil controlling the starting resistance; Fig. 7 is a vertical cross section of another embodiment of my invention showing the parts in open position; Fig. 8 is a front elevation showing the parts in starting position; Fig. 9 is a similar view showing the parts in the same position except the handle is released; Fig. 10 is a similar view showing the parts in running position; Fig. 11 is a diagram of the electrical connections and Fig. 12 is a similar diagram showing a modified connection and form of coil controlling the starting resistance.

Referring to Figs. 1 to 4 inclusive, the parts are shown mounted on a panel 1. A coil 2 for controlling the starting resistance is shown fixed to the panel having a U-shaped iron frame 3 and a central core 4, the outer ends of these parts forming the poles of the magnet. The lower part of the frame 3 carries a pair of depending side plates 5 which support shaft 6 upon which the movable parts of the controller are pivotally mounted.

An inverted U-shaped sheet iron plate 7 has inwardly extending ears 8 bent at right angles thereto and these are pivoted on the shaft 6 outside of and adjoining the plates 5. The U-shaped part 7 has an upwardly extending portion 9, which is located opposite the poles 10, 10' of another controlling magnet 11 located above the magnet 2 and mounted upon the panel 1, the pole 10 extending from and connected with the rear end of the core of the magnet and the pole 10' being the front end of the core of the magnet. When the plate 7 is pivotally swung inwardly, the extension 9 comes opposite the poles 10, 10' of the magnet 11 and is retained thereby as long as sufficient current flows in the coil 11.

Insulating plates 12 are secured on the face of the legs of the U-shaped part 7. The insulating plates 12 extend sidewise and have secured upon their faces at their outer portions respectively, the movable elements 13 of the main switch. Each of the elements 13 are connected respectively by a flexible lead 14 to the terminals 15 which form the upper fuse clips for receiving a pair of fuses 16 having the lower receiving clips 17. The latter are electrically connected with terminals 18, 18' for receiving motor connections.

The movable contacts 13 respectively engage fixed contacts 19 which are shown yieldably supported upon the panel 1. The fixed contacts are electrically connected with the line terminals 20, 20'.

Pivotally mounted upon shaft 6 is another element 21 having inwardly extending ears for this purpose located within the plates 5. The element 21 is preferably a sheet iron plate having an offset and upwardly extending part 21' carrying an adjustable screw 22. The body portion of the element 21 when swung inwardly comes opposite the poles of the magnet 2 and is retained as long as sufficient current flows in the controlling coil 2. Secured to the face and outwardly extending from the element 21 is a sheet of insulating material 23 lying in a vertical plane and having pivotally depending from its outer end a rod 24 having a handle 24' for manually controlling the movement of the element 21. The element 21 also has a depending and inwardly extending portion 25, which, when the element is in its outer position, makes electrical connection with a yieldably mounted contact 26, mounted on the panel 1 below the controlling coil 2. The element 26 is in electrical connection with a terminal 26' for receiving a connection from the motor to be controlled. When the element 21 is swung inwardly or held in its inner position, the part 25 is out of engagement with the contact 26.

An inwardly extending sheet metal plate 27 is fixed to and carried by the element 21 and passes between the two sides of the U-shaped piece 7. The inner end of the plate 27 has the side extensions 27' extending sufficiently to engage the inside faces of the U-shaped piece 7 when the element 21 is moved outwardly.

The electrical connection of the parts above described will be understood from Fig. 5 where the parts are correspondingly numbered. The incoming lines are indicated at 28, the motor armature at 29, series field 30 and shunt field at 31.

When it is desired to start the motor, the handle 24' is raised thereby forcing the element 21 inwardly and carrying with it by engagement of the screw 22 on the element 21, the movable contacts 13 so as to cause them to close the main circuit. This energizes the no-voltage coil 11 connected across the circuit, which will hold the armature 9 and element 7 in their inner position and maintain the motor circuit closed. The closing of the breaker will also first interrupt the connection of the part 25 with the contact 26 and cause the energization of the series coil 2, closing the circuit from one side of the line through the series coil 2 and a starting resistance 32, thence through the armature 29 to the other side of the circuit. The closing of the breaker will also cause the element 21 to be placed in juxtaposition to the poles of the magnet 2 and held in its inner position as long as sufficient current passes through coil 2.

The motor will thus start with the starting resistance 32 in series with the armature and it will be noted that the relationship of the parts is such that the motor circuit cannot be closed for starting the motor without insuring that the starting resistance is in circuit with the motor armature, because the closing of the breaker necessarily breaks the circuit between contacts 25 and 26.

As the motor comes up to speed and its counter electro-motive-force increases, the starting current will be gradually reduced to a predetermined amount, at which point the magnet 2 can no longer hold the element 21 against gravity or spring pressure and thus permit the element 21 and its controlling handle to fall from the starting position shown in Fig. 3 to the running position shown in Fig. 4. This outward movement of the element 21 will cause contact 25 to engage the fixed contact 26 as shown in Fig. 4 and thus cause the starting resistance to be short-circuited as shown in Fig. 5, the contact 25 being electrically connected to the junction between the series coil 2 and one terminal of the starting resistance. This short circuiting of the resistance then permits the motor to assume its full speed and automatically establish running conditions.

It will thus be seen that the coil 2 will automatically permit the starting resistance to be cut out only after the motor has attained the proper speed and the armature current reduced to a proper amount to safely permit the short circuiting of the starting resistance. Although the element 21 is thus released by the magnet 2 and permitted to assume the position shown in Fig. 4, the no voltage magnet 11 continues to hold the U-shaped element 7 and movable contacts 13 in closed position, and will only release these parts upon the failure of the line voltage or its reduction to a predetermined amount. The coil 11 thus gives automatic protection against no-voltage and the fuses 16 give automatic protection against over-load.

When it is desired to stop the motor, the handle 24' is pulled downwardly or first raised slightly and then snapped downwardly which causes the extensions 27' to engage element 7 and thus pull the armature 9 away from the poles of the magnet 11 and break the main circuit by causing the parts to again assume the position shown in Fig. 2.

The operative advantages of the controller will be apparent to those skilled in the art and it will be seen that the various features of control and protective operation are secured by a construction of a compact form and which may be economically manufactured.

Fig. 6 indicates the same construction and relationship of parts as above described, except that the coil 2 of the above construction is replaced by a shunt coil 2' connected across the terminals of the starting resistance 32 and has the advantage that in this instance the same form of coil may be used for controlling the starting resistance as is used for the no-voltage coil 11. In this case the operation is similar to that above described, except that the coil 2' will be subjected to a gradually decreasing voltage across the starting resistance 32 as the armature speeds up and its counter electromotive force increases, until finally the voltage across the resistance 32 is so much reduced that the coil 2' will release the element 21 at a predetermined current and then permit the contact 25 to engage the contact 26. This of course short circuits the starting resistance 32 as before and permits the motor to come up to full speed.

Referring to the embodiment of my invention shown in Figs. 7 to 10, the parts are shown mounted upon the panel 35, and the line terminals are shown at 36. The main fixed contacts of the controller are indicated at 37 and 38. A pair of contacts 37 are connected by a movable switch part 39 carrying at its opposite ends yieldable contacts 39' adapted to engage the fixed contacts 37 when the switch element 39 is raised. Another switch element 40 carries a pair of yieldable contacts 40' which are adapted to engage and electrically connect the pair of contacts 38 when the switch element 40 is raised.

A magnet having a no-voltage controlling coil 41 is mounted upon the panel 35 and has a U-shaped frame 42 with downwardly extending legs forming one pole of the magnet, and a central core 43 having its lower end to form the other pole of the magnet. The switch element 40 is of magnetic material and when raised will be held in its upper position by the attraction of poles of magnet 41. The switch elements 39 and 40 are mechanically connected by sleeve 44 passing centrally and freely through the core 43 of the magnet, the upper element 39 being shown electrically insulated from the lower element 40 and sleeve 44 by an interposed insulating disk 45.

Another magnet having a coil 46 for automatically controlling the circuit of the starting resistance of the motor is also mounted on the panel below the magnet 41 and has a U-shaped magnet frame 47 having parts 47' extending toward each other at the lower end of the magnet to form one pole thereof, the other pole of the magnet being formed by the top portion of the frame 47. This magnet has an iron plunger 48 in the form of a cylinder which has a lower outwardly extending flange 48'. This plunger 48 is shown in its lower position in Fig. 7 and when raised to its upper position within the coil 46 will be retained there until the current in coil 46 is reduced to a predetermined amount, at which time the plunger will fall to its lower position. The plunger 48 carries a conducting plate 49 by means of the flange 48', the plate 49 being perforated to receive the plunger 48. A spiral spring 50 is seated between the plate 49 and bottom of the magnet frame 47 and tends to force the plunger and plate 49 downwardly.

In its lower position the plate 49 bridges two contacts shown in the form of pins 51, 51', which are mounted upon and extend outwardly from the panel 35.

A handle 52 of insulating material is connected with an upwardly extending rod 53, which passes freely through the cylindrical plunger 48 and freely through the tube 44. The upper end of the rod 53 is threaded and carries adjustable nuts 54, which are adapted to engage insulating disk 45 when the rod is in its lower position or pulled downwardly. The upper portion of the rod 35 is reduced in diameter compared with the lower portion to form a shoulder 55 below the conducting element 40. When the rod 53 is pushed upwardly, this shoulder will engage the lower face of the conducting element 40 and thereby raise this element and conducting element 39 so as to cause the contacts carried thereby to engage the fixed contacts 37, 38 when closing the motor circuit. A light spiral spring 56 is seated between the upper portion of handle 52 and the lower end of plunger 48.

Fuses 16 are shown mounted on the panel on opposite sides thereof and terminals 57, 58 and 59 are shown at the lower portion of the panel for receiving the motor connections.

The electrical connections of this embodiment of my invention are indicated in Fig. 11, the parts being numbered to correspond with the parts above described. The incoming lines are connected to terminals 36, which are respectively connected to the left-hand terminals 37 and 38 and when the main circuit is closed by the switch elements 39 and 40, the circuit is continued to the right-hand fixed contacts 37 and 38 respectively. From right-hand contact 38 a connection is made through the left-hand fuse 16, through the series controlling coil 46 to contact 51' and thence by conducting element 49 or starting resistance 32 to the contact 51 and thence to terminal 57, motor armature 29, series field 30, terminal 59, and right-hand fuse 16 to the fixed terminal 37. The shunt or no-voltage coil 41 is connected across the line to the lower terminals of the fuses 16. The shunt field 31 of the motor is similarly connected across the line.

In order to start the motor the handle 52 is pushed upwardly, which raises the rod 53 and presses spring 56 until the plunger 48 and conducting element 49 are raised from the contacts 51, 51', against the pressure of spring 50. Raising rod 53 also causes the shoulder 55 to engage the lower face of the conducting element 40, which normally rests on top of the magnet frame 47, and raises the switch elements 40 and 39 to cause the yieldable contacts 39' and 40' to engage the fixed contacts 37 and 38 respectively. The parts then assume the position as shown in Fig. 8, which closes the motor circuits and causes the motor to start with the starting resistance 32 in series with the motor armature by reason of the fact that the conducting element 39 is raised from the contacts 51, 51'. The conducting elements 39 and 40 will be retained in their upper position and maintain the circuit closed as long as the line voltage exists or is above a predetermined minimum, by reason of the fact that the poles of the magnet having coil 41 will hold the magnetic element 40 as long as the no-voltage coil 41 is suitably excited. Likewise the plunger 48 and conducting element 49 will be retained in their upper positions as long as the series coil 46 carries a current above a predetermined value.

After establishing the circuit connections thus described, the handle 52 is released and will then fall to the position shown in Fig. 9 by gravity and pressure of the spring 56, the other parts remaining in their upper positions by the electromagnetic action of the controlling coils 41 and 46.

The motor will gradually increase in speed and the starting current through coil 46 gradually reduced until at a predetermined minimum the spring 50 and gravity will overcome the magnetic attraction of plunger 48 and the latter and conducting element 49 will fall to engage the contacts 51, 51' and short circuit the starting resistance 32, the parts then assuming the running position as shown in Fig. 10. The short-circuiting of the resistance 32 will cause the motor speed to further increase to the full speed of the motor.

When it is desired to stop the motor the handle 52 is forcibly pulled downwardly or may be slightly raised and snapped downwardly, which will cause the nuts 54 on rod 53 to engage the insulation 45 and force the two conducting elements 39 and 40 downwardly and open the main circuit so that the parts again assume the position shown in Fig. 7. The motor may be started again by raising the handle 52 and it will be noted that the construction is such that the motor circuits cannot be closed without first including the starting resistance 32 in the motor armature circuit. It is also evident that this construction secures a compact and economically manufactured apparatus, the protection of the motor circuits against no-voltage and over-load, as well as insuring the proper starting of the motor.

In Fig. 12 the diagram indicates the same construction and connections of the parts, except that the series coil 46 is replaced by a shunt coil 60 connected across the starting resistance 32. The operation and controlling action of the device will then be the same as already described, excepting that the release of the plunger 48 and conducting element 49 will be dependent upon the reduction to a predetermined minimum of the voltage across the starting resistance as the motor speeds up, instead of upon the reduction of the starting current to a predetermined value.

Although I have described particular embodiments of my invention, it will be understood that various modifications and exemplifications of my invention may be made without departing from the scope thereof.

I claim:—

1. In an electric motor controller, a main switch, a starting resistance, a magnet for holding said main switch in closed position, a switch for normally short-circuiting said resistance, a manually movable device whereby said second named switch may be manually opened and the main switch manually closed, and electromagnetic means for automatically causing the closure of said second named switch to short-circuit said resistance when the motor attains proper speed, and means controlled by the movement of said device whereby the main switch may be manually opened.

2. In an electric motor controller, a main switch, a starting resistance, a switch for normally rendering said resistance ineffective, a manually movable element for causing the movement of said second switch to render said resistance effective and for causing the main switch to be closed, a no-voltage magnet for retaining said main switch in closed position, and a second magnet for causing the movement of said second switch to render said resistance ineffective when the motor attains proper speed, said element having means for causing the manual opening of said main switch upon movement of said element in a direction opposite to that for closing the main switch.

LEONARD KEBLER.